United States Patent [19]

Arai

[11] Patent Number: 4,794,664
[45] Date of Patent: Jan. 3, 1989

[54] WIPERBLADE OF WINDSHIELD WIPER

[75] Inventor: Masaru Arai, Saitama, Japan

[73] Assignee: Nippon Wiper Blade Co., Ltd., Saitama, Japan

[21] Appl. No.: 163,107

[22] Filed: Mar. 2, 1988

[30] Foreign Application Priority Data

Mar. 23, 1987 [JP] Japan .................................. 62-42171

[51] Int. Cl.⁴ ................................................ B60S 1/04
[52] U.S. Cl. ............................... 15/250.42; 15/250.32
[58] Field of Search ........................ 15/250.32–250.42

[56] References Cited

U.S. PATENT DOCUMENTS

| 3,942,212 | 3/1976 | Steger et al. ............ 15/250.42 |
| 4,137,598 | 2/1979 | Sharp ...................... 15/250.42 |
| 4,422,207 | 12/1983 | Maiocco et al. . |
| 4,438,543 | 3/1984 | Noguchi et al. . |
| 4,675,934 | 6/1987 | Dal Palu .................. 15/250.42 |

FOREIGN PATENT DOCUMENTS

| 2502084 | 9/1982 | France . |
| 1502195 | 2/1978 | United Kingdom . |
| 2069827 | 9/1981 | United Kingdom ............. 15/250.42 |

Primary Examiner—Peter Feldman
Attorney, Agent, or Firm—Wenderoth, Lind & Ponack

[57] ABSTRACT

A wiperblade comprising at least two yokes with one end of one yoke is connected pivotally to intermediate portion of the other yoke. The one end of the one yoke is formed to have a pair of walls defining therebetween a recess, and the intermediate portion of the other yoke is formed to have projecting portion adapted to be received in the recess. The walls and the projecting portion slidingly engage with each other along vertical side surfaces and along arcuate end surfaces of the recess and the projecting portion. Projections and cutouts are provided respectively on the walls and recess to retain the connected condition.

6 Claims, 7 Drawing Sheets

WIPERBLADE OF WINDSHIELD WIPER

FIELD OF THE INVENTION

The present invention relates to a windshield wiper for a vehicle such as an automobile and particularly to the construction of a connecting portion between yokes of the wiperblade.

DESCRIPTION OF PRIOR ART

Figure 1:
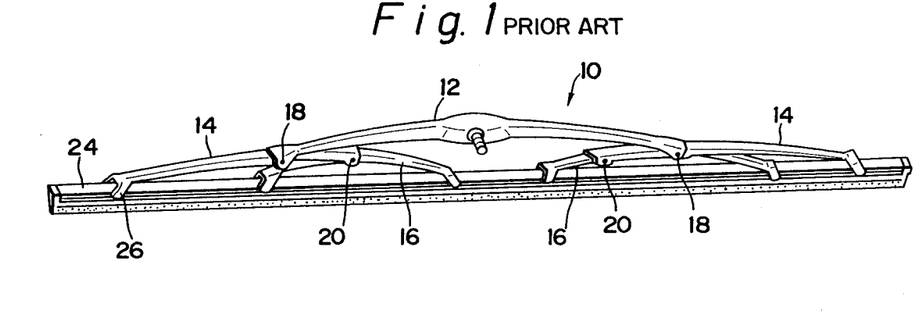
FIG. 1 is a perspective view of a prior art wiperblade.
Figure 2:
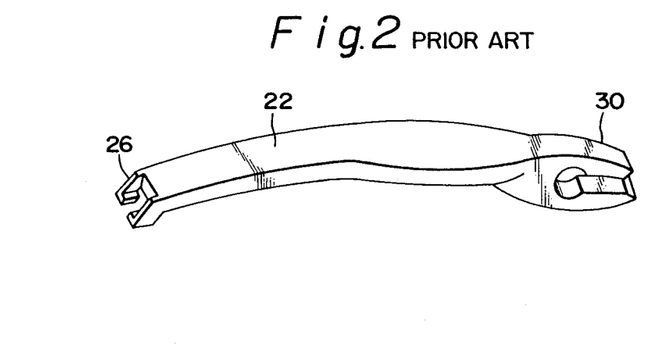
FIG. 2 is a perspective view of a yoke of another prior art wiperblade.
Figure 3:
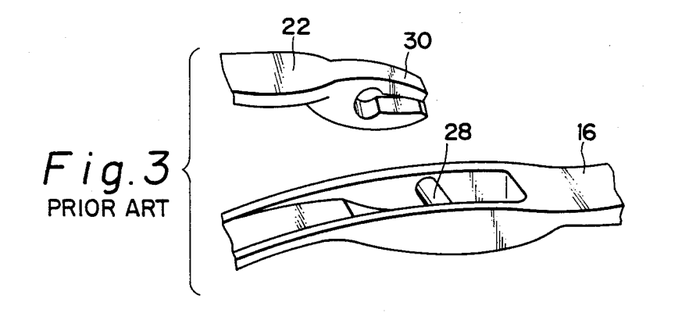
FIG. 3 is a partial perspective view of the yoke of FIG. 2 being connectable to a mating yoke.
Figure 4:
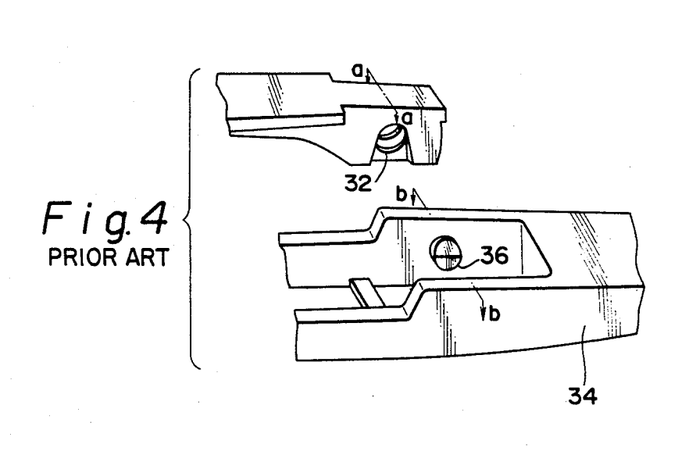
FIG. 4 is a partial perspective view similar to FIG. 3 but showing another prior art.
Figure 4A:
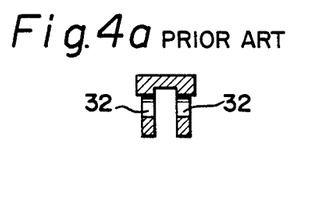
FIG. 4a and 4b are respectively sectional views taken along lines a—a and b—b in FIG. 4.
Figure 4B:
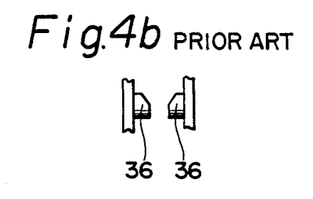

A wiperblade including a plurality of mutually connected yokes is publicly known. FIG. 1 shows a typical prior art wiperblade 10, which includes a first yoke 12, two second yokes 14 and 14 and two third yokes 16 and 16. The yoke 12 is connected respectively to the second yokes 14 and 14 through pivot pins 18 and 18, and the second yokes 14 and 14 are connected respectively to the third yokes 16 and 16 through pivot pins 20 and 20. The pivot pins 18 and 20 have circular cross section, and detailed construction thereof is known per se. FIGS. 2 and 3 show another example, wherein a second yoke 22 is formed to have on one end pawls 26 for slidingly engaging with a backing member 24 of the wiperblade 10, and a hinge portion 30 in the other end for pivotally connecting a pivot pin 28 of the third yoke 16. The pivot pin 28 has also a circular cross section. FIG. 4 shows a further modified prior art, wherein the hinge portion 30 of FIG. 3 is modified to have circular openings 32 which engage respectively with projections 36 provided on the third yoke 34. FIGS. 4a and 4b show details of the openings 32 and the projections 36.

In the wiperblade 10 of FIG. 1, the yokes 12, 14 and 16 are connected pivotally through pins 18 and 20, thus, a rotating force and a twisting force are transmitted between yokes through these pins which sometimes causes excessive wear in the pins and journal portions of the yokes. Further, the construction is complicated and it is difficult in assembling the wiperblade. FIG. 2-FIG. 4 aim to omit pins 18 and 20, however, in the embodiment of FIG. 2, since the direction of splitting a mould is different by 90° with respect to the pawl 26 and the hinge portion 30, the construction of the mould is complicated and, accordingly, the mould is expensive, and the cost of the wiperblade increases. Further, an automatic assembling process cannot easily be applied. In the wiperblade of FIG. 4, relative sliding movement between the projections 36 (FIG. 4b) and the circular holes 32 (FIG. 4a) is performed along the circumference of the projections 36 of a small circular cross section, thus, the members will be worn rapidly which tends to cause excessive play and decreases the durability. Further, in the wiperblade of FIG. 4, the assembling property is improved by reducing the rigidity of the portion of holes 32 and projections 36, which reduces the strength of the hinge portion. For ensuring the strength of the hinge portion, it is required to assure the rigidity. In such case, it is required to elevate tee temperature of parts being assembled which is troublesome and time consuming.

The present invention has been made in view of the circumstances aforementioned, and aims to provide a novel wiperblade.

SUMMARY OF THE INVENTION

A wiperblade according to the invention comprises at least two yokes with one end of one of the yokes being connected pivotally to a lengthwise intermediate portion of the other of the yokes; the one end of the one yoke being formed to have a pair of walls defining therebetween a recess, and on the outer side surfaces projections of semicircular configuration respectively with the thickness of the projections decreasing from the upper side to the lower side; and the intermediate portion of the other yoke being formed to have a circular projecting portion, opposite side walls, a pair of longitudinally extending and spaced apart grooves formed in the upper surface of the other yoke and extending through the circular projecting portion, and recessed portions formed in the lower portions of the side walls respectively for engaging respectively with the projections of the one yoke; whereby, by pressing the one end of the one yoke against the intermediate portion of the other yoke, the circular projecting portion is received in the recess of the one yoke with the inside surfaces of the side walls of the one yoke engaging respectively with the outside surfaces of the projecting portion of the other yoke in face to face relationship.

The rotating force and the twisting force transmitted between yokes are received by separate portions, which decreases the wear of connecting portions and increases the service life of the wiperblade. The combination of the projections of semi-circular configuration of one yoke and the grooves in the other yoke for receiving the projections is advantageous in assembling operation.

BRIEF DESCRIPTION OF THE DRAWINGS

Further objects and effects of the invention will become apparent from the following detailed description taken in conjunction with the drawings, in which.

FIG. is a sectional view taken along line XVI—XVI in FIG. 12.

DETAILED DESCRIPTION OF PREFERRED EMBODIMENTS

Figure 5:
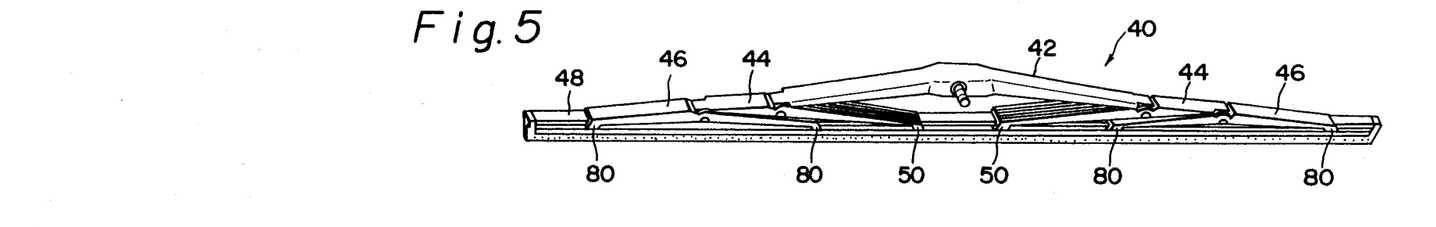
FIG. 5 is a perspective view of a wiperblade having a plurality of yokes being connected together according to the present invention.

FIG. 5 is a schematic view of a wiperblade assembly 40 having a plurality of yokes being connected according to the invention. The wiperblade 40 comprises a first yoke 42, two second yokes 44 with the intermediate portions of which being pivotally connected respectively to opposite ends of the first yoke 42, two third yokes 46 with the intermediate portions of which being pivotally connected respectively to one ends of the second yokes 44 respectively, a backing member 48 supported by opposite ends of the third yokes 46 and one ends of the second yokes 44, and a blade rubber mounted on the backing member 48. It will be noted that the combination of these yokes is known to public, and that the feature of the invention resides in the construction of the connecting portions between yokes, thus, the number and arrangement of the yokes is a mere exemplification.

Figure 21:
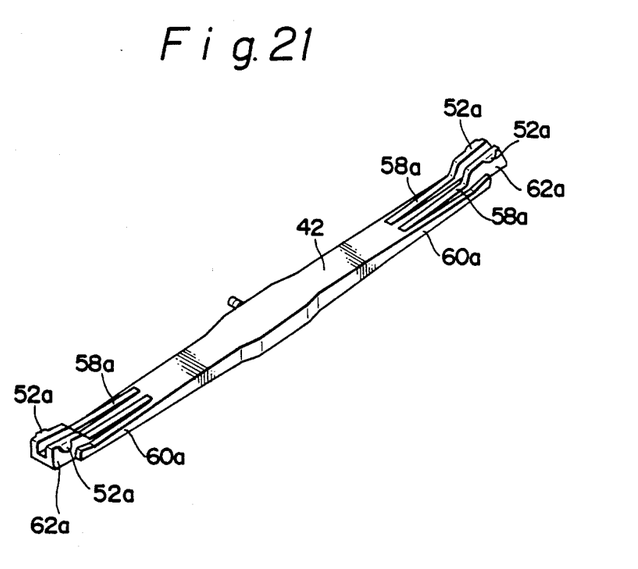
FIG. 21 is a perspective view of the bottom side of a first yoke of the wiperblade of FIG. 5 and having on opposite ends the feature of the one yoke according to the present invention.

FIG. 6 through FIG. 11 shows the second yoke 44 shown in FIG. 5, FIG. 12 through FIG. 17 show the third yoke 46 in FIG. 5, and FIG. 21 shows the first yoke 42 in FIG. 5.

Figure 8:
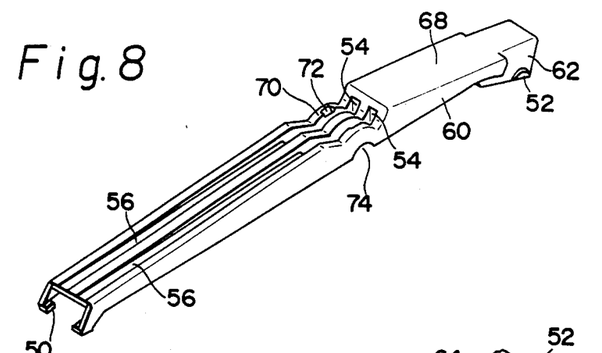
FIG. 8 is a perspective view of the yoke of FIG. 6.
Figure 11:
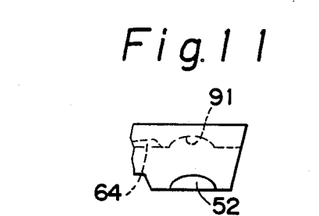
FIG. 11 is a side view of FIG. 10.

The second yoke 44 comprises a pair of pawls 50 on one end, and a pair of generally semi-circular projections 52 (FIGS. 10 and 11) on the other end. Further, a pair of slots 54 are formed in the longitudinally intermediate portion of the second yoke 44 to extend longitudinally in parallel and spaced relationship from the upper surface to the lower surface, and in the upper surface, a pair of longitudinally extending and spaced parallel grooves 56 are formed to extend from the slots 54 toward one end of the yoke 44 with the depth of which decreasing gradually from the slots 54 toward the one end. On the lower surface there are provided a pair of spaced apart and longitudinally extending projecting portions 58 which extend toward the other end and the height of which increases gradually toward the other end. A groove 64 is defined between the projecting portions 58. Further, on the opposite sides of the projecting portions 58, there are provided sideward projecting edge portions 60 with the vertical height of which decreasing toward the other end. The projecting portions 58 have on the end generally vertical walls 62 which have respectively on the outer surfaces projections 52 of generally semicircular configuration. The thickness or the projecting amount of the projections 52 decreases from the upper side of to the lower side as shown in FIG. 8. A generally flat lower surface 66 extending from the intermediate portion to the one end (left end in FIG. 7), and a generally flat upper surface 68 extending from the intermediate portion to the other end (right end in FIG. 6) are formed on the yoke 44. A recess 91 is formed as shown in FIG. 11 at the tip end of the groove 64 and between the walls 62.

Figure 17:
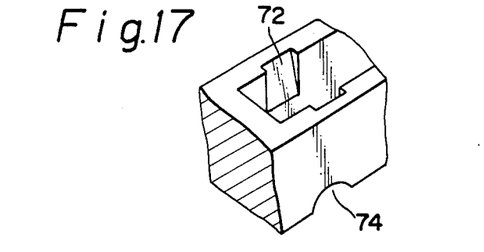
FIG. 17 is an enlarged view showing cutout portions.

There are defined in the intermediate portion of the yoke 44 and on the outside of respective slots 54, side wall portions 70 respectively. Cutouts 72 are formed in the side wall portions 70 respectively to define upward and outward inclined surfaces as shown in FIG. 17. Further, generally semi-circular recesses 74 of the configuration corresponding to the projections 52 are formed in the lower surface of the intermediate portion of the yoke 44. The width of the cutouts 72 is nearly equal to the diameter of the projections 52.

Figure 6:
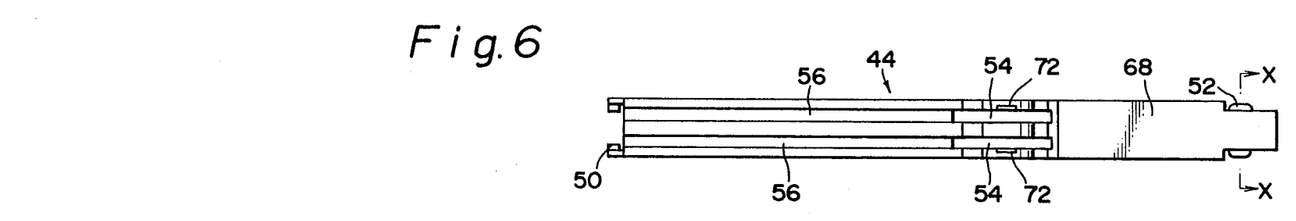
FIG. 6 is a top view of a second yoke of the wiperblade of FIG. 5 which has the feature of one yoke and also of the other yoke according to the invention.
Figure 7:
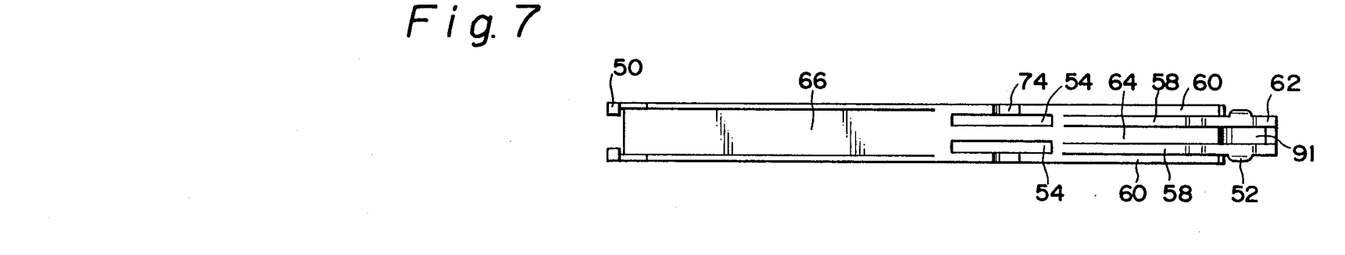
FIG. 7 is a bottom view of the yoke of FIG. 6.
Figure 12:
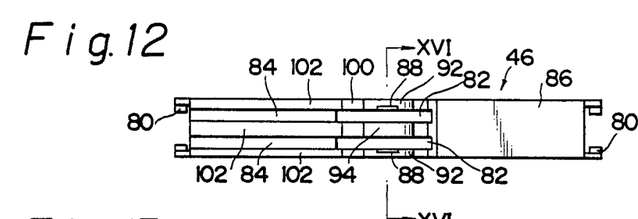
FIG. 12 is a top view of a third yoke of the wiperblade of FIG. 5, which has the feature of the other yoke according to the invention.
Figure 13:
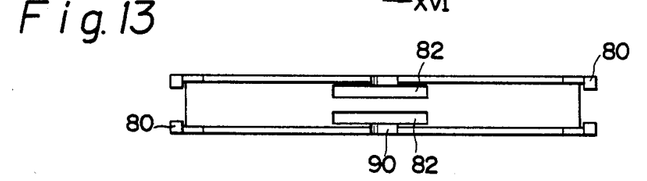
FIG. 13 is a bottom view of FIG. 12.
Figures 14, 15:
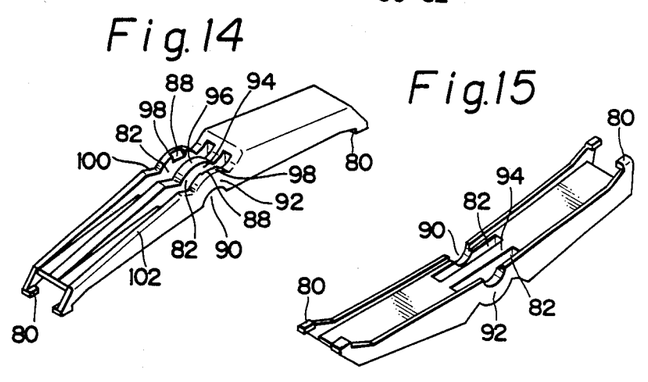
FIG. 14 is a perspective view of FIG. 12.
FIG. 15 is a perspective view of FIG. 13.
Figure 16:
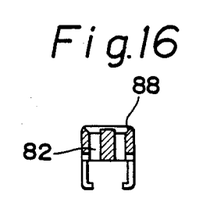

The third yoke 46 shown in FIG. 12 through FIG. 16 has on opposite ends pawls 80 which are similar to the pawls 50 shown in FIG. 6 and engage with the backing member 48. The difference between the second yoke 44 and the third yoke 46 resides in that the projections 52 of the second yoke 44 are substituted by pawls 80. Namely, as shown in FIG. 12, there are formed in the upper surface of the third yoke 46, similarly to the second yoke 44 shown in FIG. 6, a pair of longitudinally extending and spaced apart grooves 84 extending from the intermediate portion to one end, and a generally flat upper surface 86 extending from the intermediate portion to the other end. The construction and configuration of the intermediate portion is similar to that of the second yoke 44. Namely, the intermediate portion is formed to have side wall portions 92 and 92 having cutouts 88 similar to the cutouts 72, a central wall portion 94 and slots 82 and 82 which are defined between the central wall portion 94 and the side wall portions 92 and 92 and extend from the upper surface to the lower surface of the third yoke 46. Further, recessed portions 90 for receiving the projections 52 are formed respectively in the side wall portions 92 and 92. The central wall portion 94 defines on the upper surface a circular projecting portion 96, and the side wall portions 92 define on the upper surface portions 98 and 98 as shown in FIG. 14. The portions 96 and 98 extend toward one end (left end in FIG. 14) of the third yoke 46 to define three ridge portions 102 spaced by grooves 84 and 84.

Figure 9:
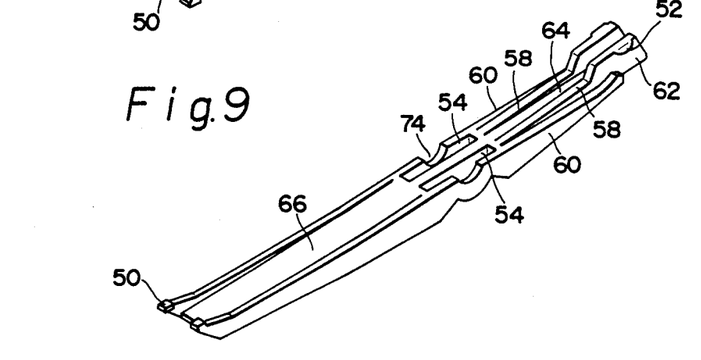
FIG. 9 is a perspective view of FIG. 7.
Figure 10:
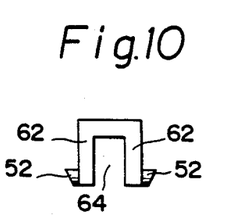
FIG. 10 is a sectional view taken along line X—X in FIG. 6.

As shown in FIG. 21, the lower surface of the first yoke 42 is somewhat similar to that of the second yoke 44 shown in FIG. 9, but differs from the second yoke 44 in that there are formed on the left side projections 52a, projecting portions 58a, edge portions 60a, walls 62a and the like similarly to the right side.

The second yoke 44 and the third yoke 46 are connected pivotally according to the following procedure.

Figure 18:
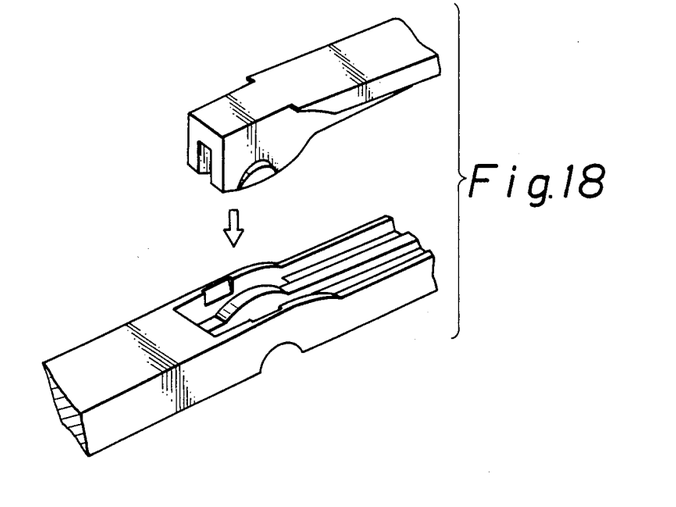
FIG. 18 is a view showing the connection between the one and the other yokes according to the invention.

The projections 52 and 52 of the second yoke 44 are located the slots 82 and 82 of the intermediate portion of the third yoke 46 as shown in FIG. 18. The projecting portions 58 and 58 on the lower surface of the second yoke 44 are located respectively and aligned with the grooves 84 and 84 in the upper surface of the third yoke 46. The projections 52 and 52 of the second yoke 44 are located to align with the cutouts 88 and 88 in the side wall portions 92 and 92 of the third yoke 46, and the second yoke 44 is forcibly moved into the third yoke 46 such that the side wall portions 92 and 92 are deflected outward by the mutual engagement between the inclined surfaces of the projections 52 and the cutouts 88 so as to receive the walls 62 and 62 of the second yoke 44 in the slots 82 and 82 of the third yoke 46. Finally, the projections 52 and 52 of the second yoke 44 are received respectively in the recesses 90 and 90 in the third yoke 46, and the circular projecting portion 96 of the third yoke 46 slidingly engages with the recess 91 (FIG. 11) of the second yoke 44 to act as a journal portion of relative pivot movement between the second and the third yokes 44 and 46.

Figure 19:
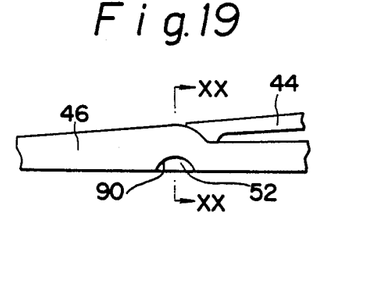
FIG. 19 is a side view showing the yokes of FIG. 18 being connected together.
Figure 20:
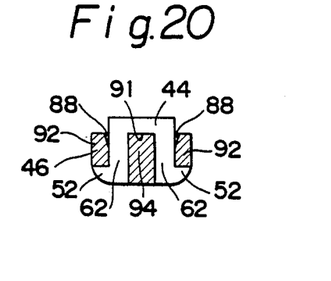
FIG. 20 is a sectional view taken along line XX—XX in FIG. 19.

When the second yoke 44 and the third yoke 46 are in a fully folded or the yokes are in generally parallel condition as shown in FIG. 19, the projecting portions 58 and 58 on the lower surface o the second yoke 44 are received in the grooves 84 in the upper surface of the third yoke 46, and the central ridge portion 102 on the upper surface of the third yoke 66 is received in the groove 64 in the lower surface of the second yoke 44, thus, the yokes can be folded compactly.

The opposite ends of the first yoke 42 are connected similarly to the intermediate portions of the second yokes 44 respectively.

According to the invention, the side wall portions 92 and 92 of the third yoke 46 act to retain the semicircular projections 52 and 52 and to engage with them at the recesses 90 and 90, thus, the rigidity of the portions 92 can be reduced which improves the assembling property. Further, the relative rotating movement between the yokes is effected on the circular projecting surface 96 on the third yoke and the recessed portion 91 in the second yoke, and the twisting load is received between the outer surfaces of the central wall portion 94 of the third yoke and the inner surfaces of the wall portions 62 and 62 of the second yoke. Accordingly, since the rotating force and the twisting force are received by separate portions, the durability of the wiperblade is improved.

Further, by forming the yokes from synthetic resin material having low frictional coefficient smooth pivot movement can be assured. The construction of the mould is relatively simple, thereby decreasing the cost of the mould, increasing the moulding speed, reducing the cost and simplifying the assembling operation. Further, the height of the wiperblade in the folded condition can be reduced.

What is claimed is:

1. A wiperblade comprising at least two yokes with one end of one of the yokes being connected pivotally to a lengthwise intermediate portion of the other of said yokes; the one end of said one yoke being formed to have a pair of walls defining therebetween a recess, and on the outer side surfaces projections of semi-circular configuration respectively with the thickness of the projections decreasing from the upper side to the lower side; and said intermediate portion of the other yoke being formed to have a circular projecting portion, opposite side walls, a pair of longitudinally extending and spaced apart grooves formed in the upper surface of said the other yoke and extending through the circular projecting portion, and recessed portions formed in the lower portions of the side walls respectively for engaging respectively with the projections of said one yoke; whereby, by pressing said one end of the one yoke against said intermediate portion of the other yoke, the circular projecting portion is received in the recess of said one yoke with the inside surfaces of the side walls of said one yoke engaging respectively with the outside surfaces of the projecting portion of said the other yoke in face to face relationship.

2. A wiperblade as set forth in claim 1, wherein the upper sides of the side walls of the intermediate portion of said the other yoke are formed respectively to have cutouts defining inward and downward inclining surfaces respectively.

3. A wiperblade as set forth in claim 1 or claim 2, wherein said one yoke having semi-circular projections on one end has on the other end pawls for engaging with a backing member of the wiperblade.

4. A wiperblade as set forth in claim 3, wherein said one yoke having semi-circular projections on one end has in the intermediate portion means for receiving semi-circular projections of the construction substantially similar to that provided on said the other yoke and receives therein one end of another yoke having on opposite ends means substantially similar to that provided on said one end of said one yoke.

5. A wiperblade as set forth in claim 1, wherein said one yoke has on the lower surface a pair of parallel, spaced apart and longitudinal projecting portions extending from said one end toward an intermediate portion of said one yoke, and said the other yoke having in the intermediate portion means for engaging with said one end of the one yoke has on the upper surface a pair of parallel and spaced apart and longitudinal grooves extending from the intermediate portion toward one end of the other yoke, said longitudinal projecting portions of said one yoke being adapted to be received in the longitudinal grooves in the other yoke when the yokes are connected together and in the fully folded condition.

6. A wiperblade as set forth in claim 1 or claim 2, wherein a first yoke having on the opposite ends means substantially similar to that provided on said one end of said one yoke is formed to have on the lower surface a pair of parallel, spaced apart and longitudinal projecting portions extending from each end toward the intermediate portion of the first yoke, the ends of the first yoke being connected respectively with intermediate portions of two second yokes respectively, and each of the second yokes having in the intermediate portion means for engaging with one end of the first yoke of the construction substantially similar to that provided in the intermediate portion so said the other yoke is formed to have on the upper surface a pair of parallel and spaced apart and longitudinal grooves extending from the intermediate portion toward one end of each of the second yokes, said longitudinal projecting portions of the first yoke being adapted to be received in the longitudinal grooves in the second yokes when the yokes are connected together and in the fully folded condition.

* * * * *